United States Patent [19]
Park

[11] Patent Number: 6,049,723
[45] Date of Patent: Apr. 11, 2000

[54] METHOD FOR AUTOMATICALLY DETECTING SIGNAL QUALITY AND REDIALING A PHONE NUMBER DURING USE OF A CELLULAR PHONE

[75] Inventor: Young-Cheol Park, Seoul, Rep. of Korea

[73] Assignee: Samsung Electronics Co., Ltd., Rep. of Korea

[21] Appl. No.: 08/991,350

[22] Filed: Dec. 16, 1997

[30] Foreign Application Priority Data

Dec. 30, 1996 [KR] Rep. of Korea ............ 96-76752

[51] Int. Cl.[7] ........................................ H04Q 7/20
[52] U.S. Cl. ..................... 455/564; 455/434; 455/455
[58] Field of Search ........................... 455/423, 425, 455/434, 550, 565, 566, 567, 564, 563, 450, 67.1, 455, 33.1, 33.2, 84.1, 84.2, 56.1, 34.1, 34.2; 329/209, 355, 554, 88.01, 88.04

[56] References Cited

U.S. PATENT DOCUMENTS

| | | | |
|---|---|---|---|
| 4,939,768 | 7/1990 | Inaba et al. | 379/58 |
| 5,224,146 | 6/1993 | Tanaka et al. | 379/61 |
| 5,406,614 | 4/1995 | Hara | 379/59 |
| 5,488,640 | 1/1996 | Redden et al. | 375/357 |
| 5,493,604 | 2/1996 | Hirayama | 379/58 |
| 5,544,224 | 8/1996 | Jonsson et al. | 379/58 |
| 5,655,002 | 8/1997 | Proctor et al. | 455/450 |

FOREIGN PATENT DOCUMENTS

| | | | |
|---|---|---|---|
| 0443721A2 | 8/1991 | United Kingdom | H04M 1/72 |
| WO94/ 28689 | 12/1994 | WIPO . | |

OTHER PUBLICATIONS

Combined Search and Examination Report Under Sections 17 and 18(3), "The Patent Office", Apr. 16, 1998.

*Primary Examiner*—Wellington Chin
*Assistant Examiner*—Pablo N. Tran
*Attorney, Agent, or Firm*—Dilworth & Barrese

[57] ABSTRACT

A method for automatically redialling a telephone number during use of a cellular phone upon the deterioration of the speech quality comprising the steps: setting an automatic redial function of said cellular phone; detecting a reception level at the time of said setting of the automatic redial function; storing said detected reception level; detecting a current reception level; determining whether said current reception level is greater than said stored detected reception level; sending a message to inform a user of said setting of the automatic redial function of said cellular phone based on a result of the previous step; determining whether a response to said message is received within a pre-determined time; and performing a redial operation if said response is received within said pre-determined time.

8 Claims, 2 Drawing Sheets

METHOD FOR AUTOMATICALLY DETECTING SIGNAL QUALITY AND REDIALING A PHONE NUMBER DURING USE OF A CELLULAR PHONE

BACKGROUND OF THE INVENTION

The present invention relates generally to a method for operating a cellular phone and, more particularly, to a method of automatically detecting signal quality and redialling a phone number during use of a cellular phone.

Users of conventional cellular telephones are sometimes faced with certain problems when attempting to operate their cellular phones in regions of weak reception. For example, when attempting to make a call in area of weak reception, the user may encounter difficulty in either connecting the call or holding a conversation without disruptions of the voice signal. Further, the user has no way of initially knowing whether he or she is operating the cellular phone in an area of weak reception. Consequently, the user must first enter a telephone number and press a transmission button before being able to determine if it is possible to connect the call and/or if the speech quality is good.

Another problem encountered during the use of a conventional cellular phone is when the user travels from an area of strong reception to an area weak reception. In this situation, the voice quality deteriorates, which causes the user to release the call for the moment and then continuously redial the number (or press the redial button of the cellular phone to redial the previous telephone number) until the user enters an area of improved reception, wherein speech signal quality improves and the user can maintain the conversation without interruptions.

These reception problems compel the user of a cellular phone to first manually perform the redialling operation and then make a determination as to whether the voice signal quality improves. This process can consume a substantial amount of the user's time, and sometimes the user even forgets to call again. Moreover, if the user utilizes the phone while driving, he/she must perform the troublesome redialling operation, which causes the user to be distracted from safe driving.

SUMMARY OF THE INVENTION

It is an object of the present invention to provide a method of automatically redialling a phone number when speech quality deteriorates during telephone conversation on a cellular phone.

It is another object of the present invention to provide a method of dialing by detecting a signal quality of the cellular phone.

It is yet another object of the present invention to provide a method of redialling a phone number once it has been decided that the call service quality is good in a cellular phone.

To accomplish these and other objectives, the invention provides for detection of the signal quality during use of a cellular phone, release of the call if the speech quality deteriorates during the call and reconnection of the call when the speech quality improves. In one aspect of the present invention, a method of redialling in a cellular phone comprises the steps of: setting an automatic redial function of said cellular phone; detecting a reception level at the time that the automatic redial function is set; storing the detected reception; detecting a current reception level; determining whether the current reception level is greater than the stored detected reception level; sending a message (e.g., a display or tone communication) to inform a user of the setting of the automatic redial function based on a result of the previous step; determining whether a response to said message is received within a pre-determined period of time; and performing a redial operation if the response is received within a pre-determined time.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

Figure 1:
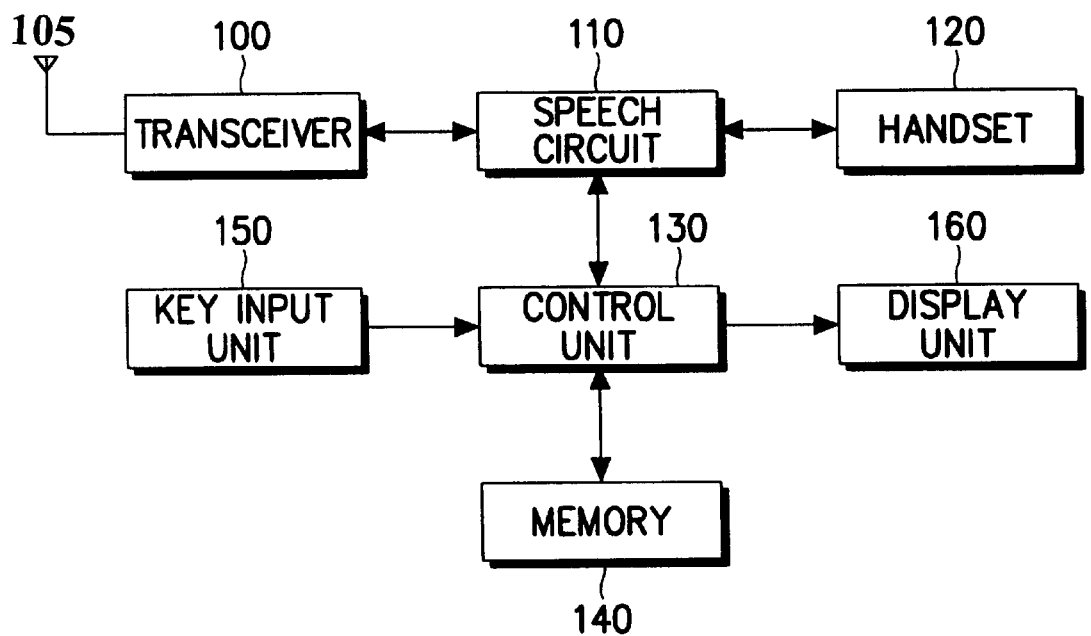
FIG. 1 is a block diagram showing components of a cellular phone which may be utilized in performing methods associated with the present invention.

In the following description, specific details about related well-known functions or configurations have been omitted if redundant or where they may render the description of the present invention ambiguous. Referring to FIG. 1, a block diagram of components of a cellular phone which may be utilized in performing methods associated with the present invention is shown. A transceiver 100 receives signals transmitted by transmission networks (not shown) and transmits signals from the cellular phone to the cellular network through an antenna 105. A speech circuit 110, which is operatively coupled to the transceiver 110, a handset 120 and a control unit 130, is provided for connecting a telephone call under the control of the control unit 130. The handset 120 receives signals from the transceiver 110 through the speech circuit 110, and transmits an audio signal to the transceiver 100 through the speech circuit 110. The control unit 130 performs general control operations of the cellular phone. A memory 140, operatively connected to the control unit 130, is provided for storing a program required to operate the cellular phone and for storing data produced by such program. A key input unit 150, operatively connected to the control unit 130, is comprised of a plurality of numeric keys (not shown) for dialing a telephone number, as well as function keys (not shown) for performing various functions, e.g., a redial key. A display unit 160, operatively connected to the control unit 130, is responsive to signals from the control unit 130 and displays the state of the cellular phone.

In a cellular phone employed to perform methods of the present invention, such as is shown in FIG. 1, if an automatic redial function is entered by pressing a function key on the key input unit 150 associated with the automatic redial function (e.g., by a user pressing the redial key on the key input unit 150), the cellular phone will automatically determine whether it is possible to make a call by checking the state of the reception, and the call will be automatically attempted if the checked state satisfies a fixed condition. Once connected, if the user determines that he or she cannot maintain that state of reception because of disruptions in the speech quality, the user will press the function key associated with setting the automatic redial function to automatically disconnect and redial the phone number when the speech quality improves.

Figure 2:
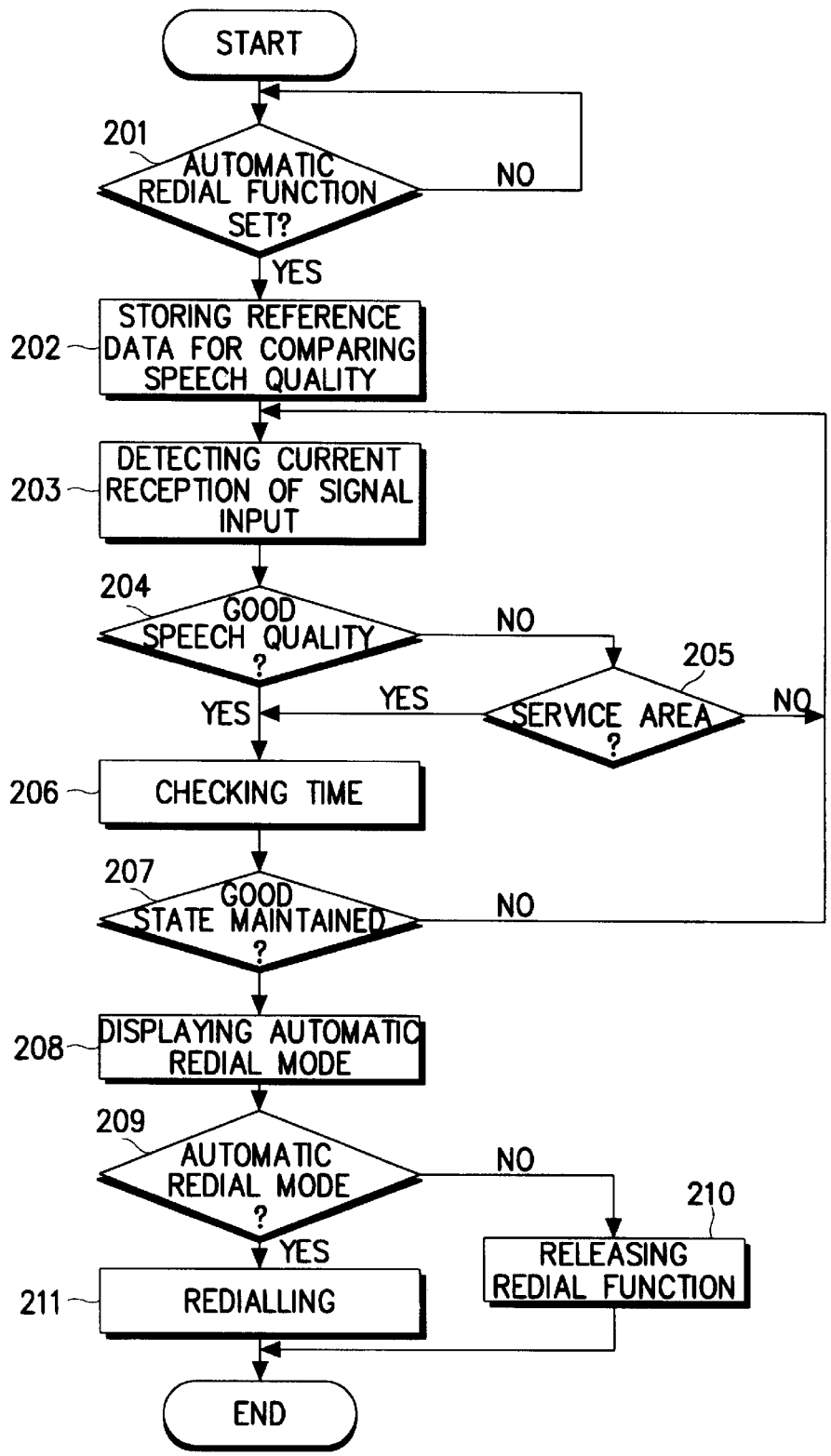
FIG. 2 is a flow diagram of a method for automatically redialling a phone number when signal quality deteriorates during use of a cellular phone, according to the present invention.

Referring to FIGS. 1 and 2, the automatic redialling procedures according to the present invention will now be described. The control unit 130 determines when the automatic redial function has been activated through the key input unit 150 (step 201). The control unit 130 detects the reception level at the time the automatic redial function was set. The detected reception level is then stored as reference data ("reference reception level") in the memory 140 to provide a reference level for comparing a current reception level to determine signal quality (step 202). Specifically, the reference reception level is an RSSI (received reference strength indicator) value or an Ec/Io value detected by the control unit 130, which represents the detected signal quality in the transceiver 100 at the time the automatic redial function was activated.

The control unit 130 then detects the current reception level in the transceiver 100 (step 203). The control unit 130 then determines if the signal quality is good by comparing the reference reception level to the current reception level in the transceiver 100 (step 204). In situations where the current reception level is not good (i.e., the current reception level is less than the reference reception level), the control unit 130 determines if the cellular phone is being operated in its service area (step 205). If the cellular phone is not being operated in its service area, the control unit 130 continuously measures the current reception level of the signal input (step 203).

If, on the other hand, the current reception level was determined to be good in step 204 (i.e., the current reception level is greater than the reference reception level which is stored in memory 140), or if the current reception level is not good (i.e., the current reception level is less than the reference reception level) but it is determined that the cellular phone is being operated in its service area (step 205), the control unit 130 then determines if a good current reception level is maintained over a certain period of time (step 206). The control unit 130 then determines whether the quality of the current reception level is maintained for a pre-determined time (step 207). If the quality of the current reception level is maintained for a period of time which is shorter than the pre-determined time, the control unit 130 will continuously measure the current reception level of the signal input (return to step 203).

If, on the other hand, the quality of the current reception level is maintained for a period of time which is greater than the predetermined time, the control unit 130 will display a message on the display unit 160 to inform the user that the cellular phone is in the automatic redial mode (step 208) (i.e., reminding the user that the automatic redial function was previously set). Alternatively, the control unit 130 may transmit a voice signal or a tone signal to the handset 120 to indicate that the cellular phone is in the automatic redial mode.

The control unit 130 then determines if an automatic redial mode confirming operation is performed (step 209). The automatic redial mode confirming operation is performed by the user pressing the function key on the key input unit 150, which corresponds to the automatic redial function, within a pre-determined period of time after the confirming message is displayed (or the tone signal sent). The control unit 130 receives the signals generated by pressing such function key.

If the automatic redial mode is not confirmed by the user (i.e., the function key corresponding to the automatic redial function is not pressed within the pre-determined period of time), the control unit 130 releases the automatic redial function (step 210). If such function key is pressed within the predetermined period of time, however, the control unit 130 will perform the automatic redial function (step 211), i.e., the previous telephone number is redialled.

As demonstrated above, if the reception is determined to have improved by a fixed degree after initially detecting weaker reception by the cellular phone, the invention provides for informing the user of such improved reception and provides for automatic redialling of a previous phone number during use of a cellular phone. Therefore, the present invention alleviates the burden of the user having to check the speech quality and redialling when the signal quality improves. The user can also drive safely while using the cellular phone.

Although an illustrative embodiment of the present invention has been described herein with reference to the accompanying drawings, it is to be understood that the invention is not limited to that precise embodiment, and that various other changes and modifications may be affected therein by one skilled in the art without departing from the scope or spirit of the invention. All such changes and modifications are intended to be included within the scope of the invention as defined by the appended claims.

What is claimed is:

1. A method of redialling a phone number during use of a cellular phone, comprising the steps of:

(a) setting an automatic redial function of said cellular phone;

(b) detecting a reception level at the time of said setting of the automatic redial function;

(c) storing said detected reception level;

(d) detecting a current reception level;

(e) determining whether said current reception level is greater than said stored detected reception level;

(f) sending a message to inform a user of said setting of the automatic redial function of said cellular phone based on a result of step (e);

(g) determining whether a response to said message is received within a pre-determined time; and (h) performing a redial operation if said response is received within said pre-determined time.

2. The method of claim 1, wherein said message is sent when said current detected reception level is greater than said stored reception level for a pre-determined period of time.

3. The method of claim 1, further comprising the step of cancelling said automatic redial function when no response to said message is received within said pre-determined period of time.

4. The method of claim 1, wherein said message is one of a character message and a voice signal.

5. A method of redialling a cellular phone having a function key for setting an automatic redial function and for setting a redial function, comprising the steps of:

(a) setting said automatic redial function by pressing said automatic redial function key;

(b) storing, as reference data for comparing a speech quality, a reception level detected at a time said automatic redial function is set;

(c) detecting a current reception level on a continuous basis;

(d) determining whether said current detected reception level is greater than said reference data;

(e) sending a message to inform a user of said setting of the automatic redial function if said current detected reception is determined to be greater than said reference data for a first predetermined period of time; and (f) determining whether said setting of the automatic redial function is confirmed by the user within a second pre-determined period of time after said message is sent; and (g) performing said redial function if said confirmation is performed within said second pre-determined period of time.

6. The method of claim 5, wherein said confirmation of said setting of the automatic redial function is performed by pressing said redial function key.

7. The method of claim 5, further comprising the step of checking whether said cellular phone is in its service area when said current detected reception level is less than said reference data.

8. The method of claim 5, wherein said automatic redial function is cancelled if said automatic redial function is not confirmed within said second pre-determined period of time.

* * * * *